(12) United States Patent
Smedberg et al.

(10) Patent No.: US 7,203,720 B2
(45) Date of Patent: Apr. 10, 2007

(54) WEB SERVER HIT MULTIPLIER AND REDIRECTOR

(75) Inventors: Michael E. Smedberg, Oakland, CA (US); Boris Andreyevich Krasnoiarov, El Cerrito, CA (US); Daniil Khidekel, Berkeley, CA (US)

(73) Assignee: BEA Systems, Inc., San Jose, CA (US)

( * ) Notice: Subject to any disclaimer, the term of this patent is extended or adjusted under 35 U.S.C. 154(b) by 0 days.

(21) Appl. No.: 10/414,813

(22) Filed: Apr. 16, 2003

(65) Prior Publication Data

US 2004/0103078 A1 May 27, 2004

Related U.S. Application Data

(60) Provisional application No. 60/429,826, filed on Nov. 27, 2002.

(51) Int. Cl.
*G06F 15/16* (2006.01)
*G06F 15/173* (2006.01)
*G06F 11/00* (2006.01)

(52) U.S. Cl. .............. 709/201; 709/223; 709/224; 714/6

(58) Field of Classification Search .............. 707/1; 709/217, 219, 201, 223, 224; 714/6
See application file for complete search history.

(56) References Cited

U.S. PATENT DOCUMENTS

| | | | | |
|---|---|---|---|---|
| 5,278,647 A | * | 1/1994 | Hingorani et al. | 375/240.15 |
| 5,689,707 A | * | 11/1997 | Donnelly | 707/206 |
| 5,764,883 A | * | 6/1998 | Satterfield et al. | 714/38 |
| 5,842,019 A | * | 11/1998 | Kolawa et al. | 717/130 |
| 5,894,554 A | * | 4/1999 | Lowery et al. | 709/203 |
| 5,951,694 A | * | 9/1999 | Choquier et al. | 714/15 |
| 6,081,829 A | * | 6/2000 | Sidana | 709/203 |
| 6,157,940 A | * | 12/2000 | Marullo et al. | 703/27 |
| 6,205,491 B1 | * | 3/2001 | Callsen et al. | 719/315 |
| 6,237,114 B1 | * | 5/2001 | Wookey et al. | 714/47 |
| 6,324,492 B1 | * | 11/2001 | Rowe | 703/13 |
| 6,363,467 B1 | * | 3/2002 | Weeks | 711/170 |
| 6,499,049 B2 | * | 12/2002 | Waldo et al. | 718/104 |
| 6,499,052 B1 | * | 12/2002 | Hoang et al. | 709/203 |
| 6,502,133 B1 | * | 12/2002 | Baulier et al. | 709/224 |
| 6,606,643 B1 | * | 8/2003 | Emens et al. | 709/203 |
| 6,606,708 B1 | * | 8/2003 | Devine et al. | 726/8 |
| 6,643,614 B2 | * | 11/2003 | Ding et al. | 702/186 |
| 6,658,653 B1 | * | 12/2003 | Bates et al. | 717/131 |
| 6,675,214 B2 | * | 1/2004 | Stewart et al. | 709/226 |

(Continued)

*Primary Examiner*—Rupal Dharia
*Assistant Examiner*—Kristie Shingles
(74) *Attorney, Agent, or Firm*—Jackson & Co., LLP; Andrew V. Smith

(57) ABSTRACT

A method of analyzing a resource leak on a first web server uses a second web server. A first HTTP request message is received from a client at a first Web server and includes an identifier of an information component stored on the first Web server which generates a reply to the first HTTP request message including the information component, and sends the reply to the client. Multiple duplicate HTTP request messages for the information component are generated at the first Web server in response to the receiving of the first request, for analyzing a resource leak on the first Web server. Each of the duplicate HTTP request messages includes the identifier of the information component. The duplicate HTTP request messages are transmitted to a second Web server and multiply any existing. resource leak, thereby facilitating detection, diagnosis and/or analysis. The transmitting to the second Web server maintains the first Web server free from receiving the multiple duplicate HTTP request messages.

56 Claims, 5 Drawing Sheets

U.S. PATENT DOCUMENTS

| | | |
|---|---|---|
| 6,718,390 B1 * | 4/2004 | Still et al. .................... 709/229 |
| 6,754,701 B1 * | 6/2004 | Kessner ....................... 709/219 |
| 6,763,383 B1 * | 7/2004 | Evison et al. ................ 709/224 |
| 6,775,824 B1 * | 8/2004 | Osborne et al. ............. 717/125 |
| 6,792,393 B1 * | 9/2004 | Farel et al. .................. 702/186 |
| 6,934,934 B1 * | 8/2005 | Osborne et al. ............. 717/126 |
| 6,961,759 B2 * | 11/2005 | Brown et al. ................ 709/217 |
| 2002/0002602 A1 | 1/2002 | Vange et al. |
| 2002/0046170 A1 * | 4/2002 | Gvily ............................ 705/42 |
| 2002/0078191 A1 * | 6/2002 | Lorenz ........................ 709/223 |
| 2002/0174241 A1 * | 11/2002 | Beged-Dov et al. ......... 709/230 |
| 2003/0061378 A1 | 3/2003 | Mazzitelli |
| 2003/0158816 A1 | 8/2003 | Rouse |
| 2004/0088349 A1 * | 5/2004 | Beck et al. .................. 709/203 |

* cited by examiner

WEB SERVER HIT MULTIPLIER AND REDIRECTOR

CROSS-REFERENCE TO RELATED APPLICATIONS

This application claims the benefit of U.S. Provisional Application No. 60/429,826, filed Nov. 27, 2002, the disclosure thereof incorporated by reference herein in its entirety.

BACKGROUND

The present invention relates generally to Web servers, and particularly to solving resource leaks in Web servers.

The recent rapid increase in the demand for network services has caused a similar increase in the number and complexity of Web servers produced to serve that demand. Due to this complexity Web servers are exhaustively tested in development before being taken into production, where they serve customers in real time. But once in production, Web servers can be difficult to test, and the problems revealed can be difficult to solve. One common problem is the resource leak, where some resource, such as memory, is gradually consumed in a manner that is detrimental to the stability or performance of the Web server. One common resource leak is the memory leak.

Web servers provide information components, such as Web pages, word processing documents, spreadsheets, images, movies, and the like, to customers. Some of these information components are static, and therefore can be provided without further processing. Other information components are dynamic, and must be generated by an information component generation process before delivery to a customer. A resource leak is caused when the resource is marked as "in use" while the information component generation process is working, but is not released when the process no longer needs that resource. The resource may be memory, synchronization objects, communication ports, or other finite computer resources. Because the resource is never released, it is not available for use by the same or other processes. Over time, such resource leaks can cause the process or whole operating system to malfunction.

Resource leaks in production Web servers are typically very time consuming and difficult to diagnose and correct.

First, resource leaks often happen very slowly, so days or weeks are spent collecting data to evaluate the effectiveness of each proposed solution. If many solutions must be tried, this process can consume months or more.

Second, resource leaks often happen on production Web servers. Because these Web servers must be highly reliable, personnel diagnosing the resource leak may not be allowed to significantly modify the system. One common way of diagnosing a resource leak is to disable a part of the leaking process. Parts are individually disabled and enabled. When the resource leak is seen to disappear, the parts that are disabled are usually responsible for the leak. This strategy is generally disallowed on production Web servers, since the loss of functionality associated with disabling components is unacceptable. Other diagnostic software components are often used to detect and diagnose resource leaks. Tools such as leak detectors can be very valuable when finding small leaks, but the use of these tools on production servers is often forbidden. Administrators responsible for the stability of production Web servers do not want to put that stability in jeopardy by running additional diagnostic and debugging software on the Web server.

Third, resource leaks are often associated with unusual or unexpected circumstances. Most software systems used on production Web servers have undergone significant testing before being deployed. Therefore, leaks associated with commonly used features of the Web server are unusual. Those leaks are typically found and corrected before deploying the software. When a leak is found on a production Web server, it is frequently associated with a feature that was not heavily tested, perhaps because it didn't seem important, or because the particular sequence of user actions was not predicted. Identifying a resource leak on a production Web server is generally pretty easy. The resource is observed to be exhausted. Identifying the cause of the resource leak is much harder, since it's typically NOT associated with any common functionality. Typically, when a flaw or bug is found in software, the circumstances that lead to the display of the flaw are reproduced in a laboratory. Once a fix has been proposed, that fix is implemented and tested in the laboratory. This model doesn't work well for leaks detected on a production system, since reproducing the circumstances of the production system in a laboratory is difficult. The usage characteristics of a production system are complicated and difficult to characterize.

SUMMARY

The invention is known as a Web Hit Multiplier and Web Hit Redirector, and features a method, apparatus, and computer-readable media. The invention intercepts hyper-text transfer protocol (HTTP) requests intended for a Web server, copies and processes those requests, then forwards the requests to the relevant Web server. It is conceptually similar to a proxy server in that it is a layer between Web clients (such as Browsers) and the Web server, though it is most easily implemented as a plug-in to the Web server to be tested. Web clients attach to the Web Hit Multiplier and Web Hit Redirector as though it were a Web server, while Web servers receive requests from the Web Hit Multiplier and Web Hit Redirector as though it were a Browser. It involves two aspects.

Web Hit Multiplier

The first aspect is a Web Hit Multiplier, which increases the number of HTTP requests processed by the Web server, thereby increasing the size of any existing resource leak. This makes the leak easier to detect and diagnose. The increase in requests is accomplished by multiplying existing incoming requests. Each incoming request is recorded and transmitted to the Web server multiple times. The first copy of the request can be thought of as the primary request, and additional copies can be thought of as secondary requests.

Part of the Web Hit Multiplier is most easily implemented as a plug-in to the Web server in question. When the Web Hit Multiplier receives an HTTP request from a Browser (or other HTTP client), the plug-in records the request, and allows it to pass through to the Web server unmodified. It then forwards the request to a second component, which copies the request a number of times, and sends each request to the Web server being tested. When the Web server replies with an HTTP response to the primary request, the HTTP response is returned to the Browser. The Web Hit Multiplier should not return the responses to the secondary requests to the Browser, since the Browser did not make those requests (they were made by the Web Hit Multiplier.)

The Web Hit Multiplier does not multiply requests that were generated by the Web Hit Multiplier itself. It can recognize its own requests via a number of methods, including client IP address, a custom header, etc.

The Web Hit Multiplier includes additional features to help with diagnosis. In one embodiment, a filter selects resources for which requests should be multiplied based on predetermined criteria.

First, it includes a filter that identifies the resources for which requests should be multiplied. When a leak is suspected in one component of the Web server, requests to just that component can be multiplied, while leaving requests to other components unmultiplied. Choosing to multiply (or not multiply) suspected components can help narrow down the component that is causing the leak. Since Web servers typically identify components and resources via Universal Resource Locators (URLs), the Web Hit Multiplier filters requests by URL, and only multiplies those URLs that match zero or more specified regular expressions. Additionally, the user may specify zero or more regular expressions that indicate URLs which should NOT be multiplied (i.e. the user can specify a positive condition that triggers multiplication or a negative condition that suppresses it.)

Second, it includes a filter that identifies requests that are intended to change the state of the Web server, and does not multiply those requests. For example, suppose that a Web server is acting as a banking system. When a client requests a transfer of funds from one account to another through the bank Web site, the Web Hit Multiplier will NOT multiply this request. The user would NOT want the transfer to happen multiple times.

Most requests to change state are handled through HTTP POST requests, as described in the HTTP specification. The Web Hit Multiplier will allow the user to specify which HTTP methods (e.g. "POST" or "GET") should be multiplied, and which should not. URL based filtering (as described above) can also be used to filter out unwanted actions.

Web Hit Redirector

The second aspect is a Web Hit Redirector, which allows a secondary, test Web server to receive the same HTTP requests as a primary, production Web server. The Web Hit Redirector is very similar to the Web Hit Multiplier, except that instead of sending copies of the request to the primary Web server, the copied requests are processed and sent to the test Web server. This allows diagnosticians to modify the test Web server, and analyze the effects of the change in an environment with "real world" usage patterns. This is accomplished by copying incoming requests. Each incoming request is copied one or more times. The original copy is transmitted to the production Web server. This is known as the primary request. Other copies are transmitted to the test Web server or servers. These are known as test, or secondary, requests. In the Web Hit Redirector, the primary requests and test requests are typically NOT identical. The test requests must be "corrected" to be acceptable to the test Web server.

Requests must be modified before forwarding them to the test Web server due to the way that Web servers identify the client that they are serving. HTTP is a stateless protocol, so in general the Web server does not know which client made which request. For example, if the Browser requested the "next" page of a long document, the Web server would need to know which client made the request—was it the client that is viewing page 2 (in which case it should return page 3), or was it the client that is viewing page 27 (in which case it should return page 28.) The HTTP protocol does not solve this problem, but there are standard practices to get around this limitation.

Standard industry practice is to use a "cookie" to maintain state on the Web server. The cookie is a small identifier that's generated by the Web server, and is associated with the particular client. When the server responds to a request, it generates a cookie, and returns it with the response. The Browser (or other client) stores the cookie, and returns it to the Web server with any subsequent request. The Web server can use the cookie to correlate subsequent requests with the client that's making the request. This cookie is called a session cookie since it's used to establish the "session" of the current user on the Web server. For example user A might request "the next page." The Web server would return page 1, along with the session cookie "User1". Then user B might request "the next page", and the Web server would again return page 1, along with the session cookie "User2." Next, user A might request "the next page" (meaning page 2.) Along with the request, user A returns the session cookie "User1" to the Web server. The Web server remembers that the cookie "User1" is associated with a user that has already seen page 1, so it returns page 2. The Web server knows that user A should now see page 3 next, and that user B should see page 2 next, even though the Web server doesn't really know anything else about the users. All major browsers and Web servers support session cookies in this manner, even though cookies are not strictly part of the HTTP 1.0 specification.

This creates a problem for the Web Hit Redirector. Since the Web server defines the format and meaning of cookies, the cookies from one Web server cannot, in general, be successfully sent to a second Web server. The second Web server will not understand the meaning of the cookie (e.g. sending the cookie "User2" to some other Web server may result in an error, since there may only be one user on the second system. Even if there are two users, the second user of the second Web server is NOT the same user as the second user of the first Web server.) Thus, when the Web Hit Redirector sends a request that was originally intended for the production Web server to the test Web server, the test Web server will not know how to interpret any cookies associated with the request.

The Web Hit Redirector maps cookies on the production Web server to cookies on the test Web server. When it receives a request for a resource on the production Web server, it copies the request, and replaces any cookies that identify state on the production Web server with the corresponding cookies for the test Web server. To do so, it maintains a map of production cookies to test cookies.

Before forwarding a request to the test Web server, the Web Hit Redirector modifies the request, replacing any session cookies that were intended for the production Web server with the mapped cookies that are appropriate to use with the test Web server. The Web Hit Redirector includes additional features to help with diagnosis.

The Web Hit Redirector contains the same filtering features as the Web Hit Multiplier. Specifically, it has the ability to filter requests by URL, selectively allowing or disallowing those URLs that match specified regular expressions. It also has the ability to filter by HTTP method (e.g. redirecting HTTP GET requests, while ignoring HTTP POST requests.)

The details of one or more implementations are set forth in the accompanying drawings and the description below. Other features will be apparent from the description and drawings, and from the claims.

Figure 1:
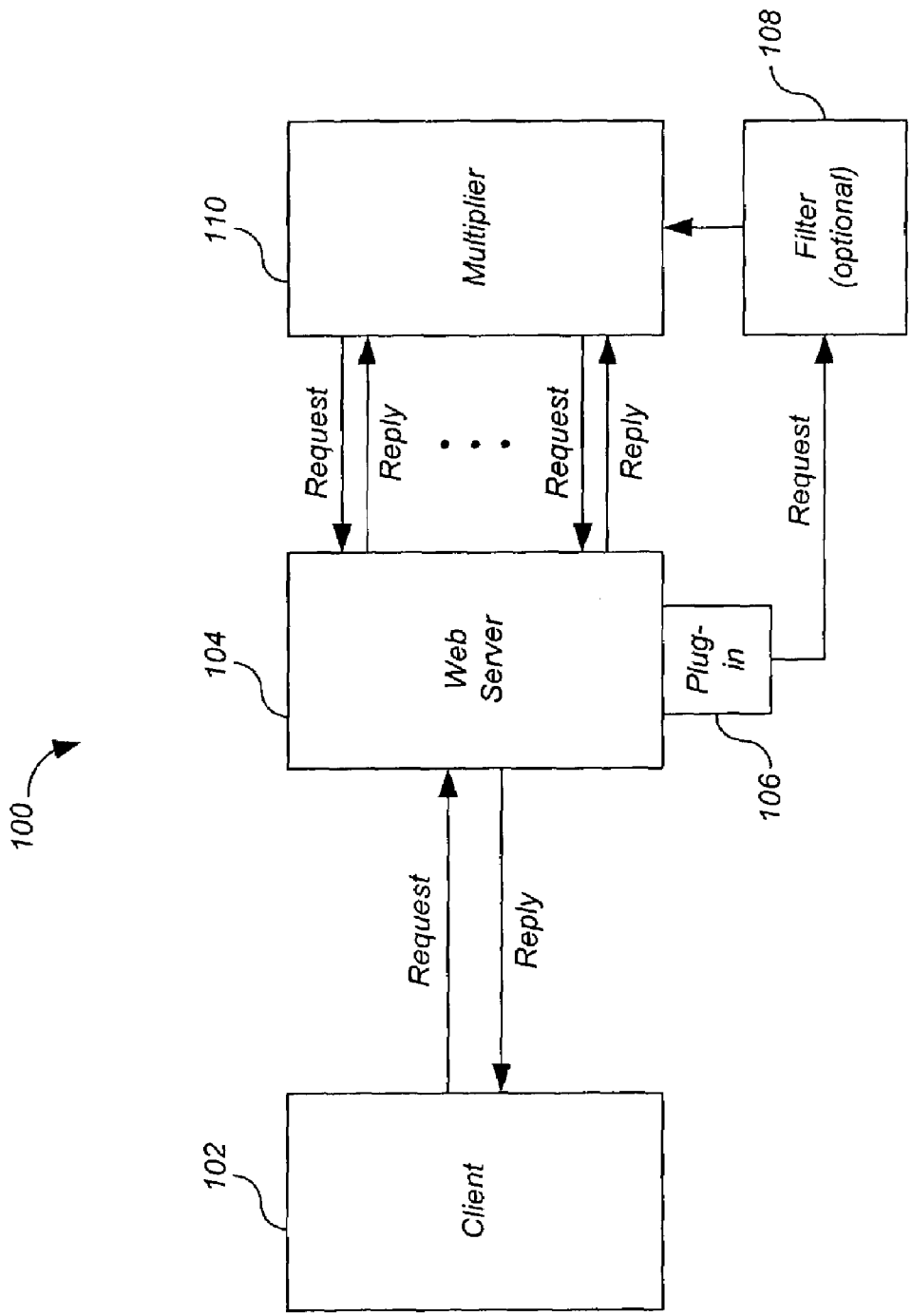
FIG. 1 shows a data communications system according to one embodiment.

The leading digit(s) of each reference numeral used in this specification indicates the number of the drawing in which the reference numeral first appears.

DETAILED DESCRIPTION

As used herein, the terms "client" and "server" generally refer to an electronic device or mechanism, and the term "message" generally refers to an electronic signal representing a digital message. These terms are used to simplify the description that follows. The clients and servers described herein can be implemented on any standard general-purpose computer, or can be implemented as specialized devices.

The amount of access to a Web server is often described by the "hit rate" on the server, which reflects the number of requests received and responded to by the Web server in a given amount of time. As described above, the user hit rate for a production Web server is often insufficient to permit prompt identification or diagnosis of a slow resource leak. The inventors have recognized that a slow resource leak would be evident much sooner if the hit rate on the information component causing the leak were higher. In other words, if a resource is leaked at a constant rate per hit, increasing the hit rate will make the leak more evident, and therefore easier to fix.

One possible approach is to attempt to simulate those user requests, and simply increase the hit rate of the simulation. For example, a tool could be used to repeatedly request a resource from an information component on the server—as soon as the server fulfills a request a new request is made. One disadvantage of this approach is that it is necessary to know which information component is causing the leak in order to simulate requests to that information component. This is a significant limitation, since the primary purpose of testing is to discover which information component is leaking! In other words, it's difficult to accurately simulate the load on a production Web server without knowing which aspects of the load are pertinent to the simulation.

FIG. 1 shows a data communications system 100 according to one embodiment. Data communications system 100 includes a client 102 such as a Web browser, a Web server 104, a plug-in 106, an optional uniform resource locator (URL) filter 108, and a multiplier 110. Web server 104, URL filter 108, and multiplier 110 are preferably implemented as separate processes executing on one or more computers. Plug-in 106 is preferably implemented as an internet server application program interface (ISAPI) filter, although other implementations are contemplated. Web server 104 hosts one or more information components, such as Web pages and the like, that can be accessed by client 102 by sending an HTTP request.

Figure 2:
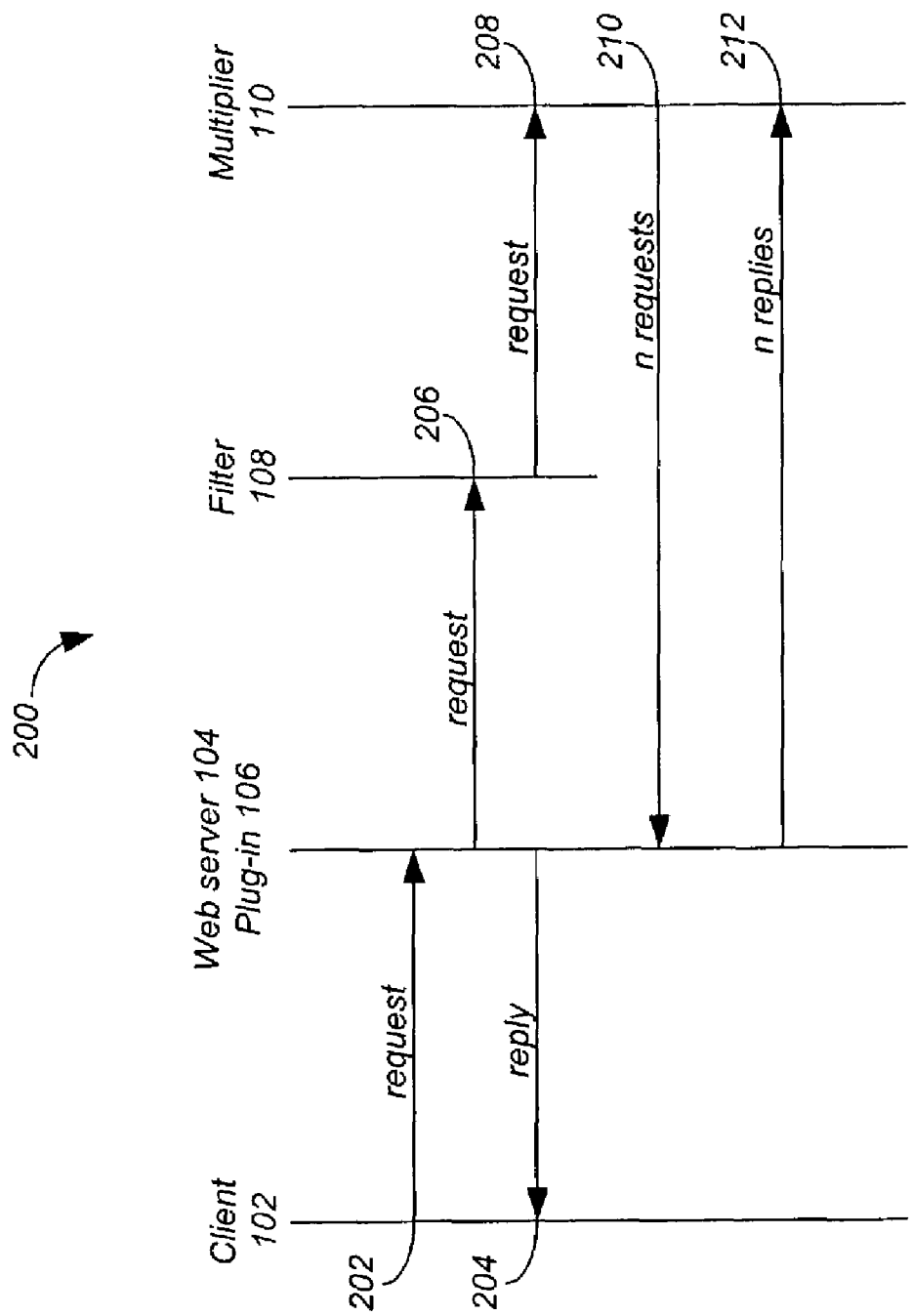
FIG. 2 depicts a process performed by the communications system of FIG. 1 according to one embodiment.

FIG. 2 depicts a process 200 performed by communications system 100 according to one embodiment. Client 102 transmits a hyper-text transfer protocol (HTTP) request message to Web server 104 (step 202). The HTTP request message can be generated automatically or in response to a user action. The HTTP request message includes an identifier of an information component stored on Web server 104. Web server 104 receives the HTTP request message. In response to the HTTP request message, Web server 104 generates an HTTP reply message according to conventional methods, and transmits the HTTP reply message to client 102 (step 204).

In embodiments employing optional URL and method filter 108, plug-in 106 transmits a copy of the HTTP request message to filter 108 (step 206). In other embodiments, plug-in 106 transmits a copy of the HTTP request message directly to multiplier 110. Filter 108 determines whether to forward the HTTP request message to multiplier 110 according to user-selectable filter criteria. In one embodiment, filter 108 applies a regular expression to each HTTP request, and forwards only those HTTP request that match the expression. In another embodiment, filter 108 can forward only those HTTP requests that do not match the expression. In a third embodiment, filter 108 can forward only those HTTP requests that match specified HTTP methods. Other embodiments include various combinations of these and other criteria.

With this feature, particular portions of a Web site can be amplified, while other portions are not. This feature is particularly useful for isolating resource leaks. For example, if a resource leak is seen, and it's suspected to be associated with a particular portion of the Web site, URL filter 108 can amplify only that portion of the Web site. If the resource leak is accelerated, the leak is likely associated with that portion of the Web site. Then the reverse test can be performed, to amplify everything except that portion of the Web site. If the leak is not amplified, then it's very certain that the leak is associated with that portion of the Web site.

Multiplier 110 receives a forwarded HTTP request message (step 208), and generates a predetermined number n of copies of the HTTP request message, where $n \geq 1$. Multiplier 110 transmits the copies of the HTTP request message to Web server 110 (step 210). In this way, process 200 "amplifies" all user requests for a particular information component, thereby increasing the rate of any resource leak associated with that information component, making that leak easier and faster to identify and diagnose. In some embodiments multiplier 110 includes a reply analysis tool that analyzes the replies returned by Web server 104 (step 212) in response to the multiplied requests generated by the multiplier, thereby providing additional test data.

Embodiments of the invention can be used to test Web servers during manual click testing as well. Rather than multiplying requests from consumers in a production environment, these embodiments multiply requests from testers in a development environment. Each click of the tester is amplified by some large number, simulating many users clicking simultaneously.

Figure 3:
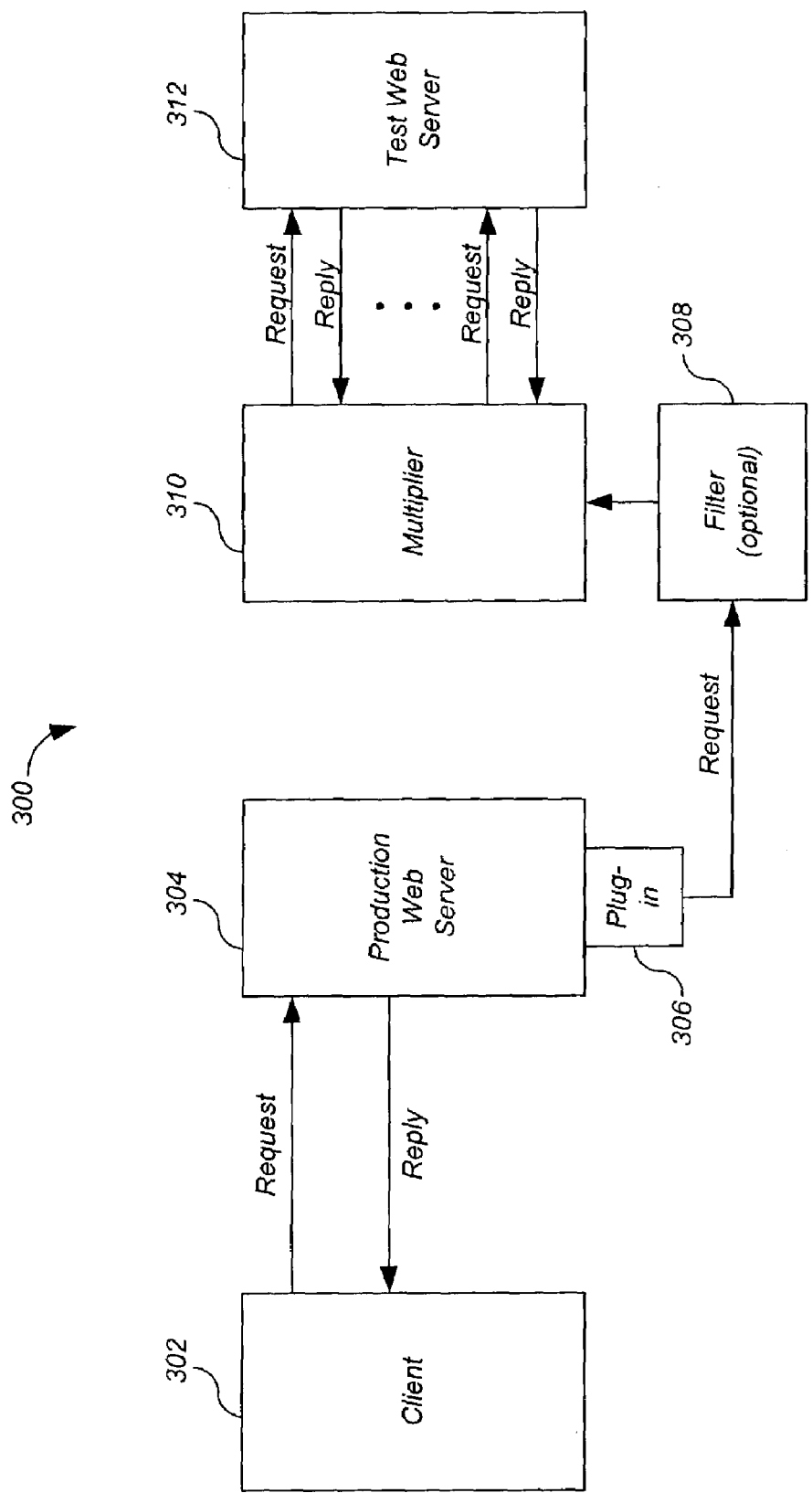
FIG. 3 shows a data communications system according to one embodiment.

FIG. 3 shows a data communications system 300 according to one embodiment. Data communications system 300 includes a client 302 such as a Web browser, a production Web server 304, a test Web server 312, a plug-in 306, an optional URL filter 308, and a multiplier 310. Web servers 304 and 312, URL filter 308, and multiplier 310 are preferably implemented as separate processes executing on one or more computers. Plug-in 306 is preferably implemented as an ISAPI filter. Web server 304 hosts one or more information components, such as Web pages and the like, that can be accessed by client 302. Test Web server 312 hosts one or more of the information components hosted by production Web server 304.

Figure 4:
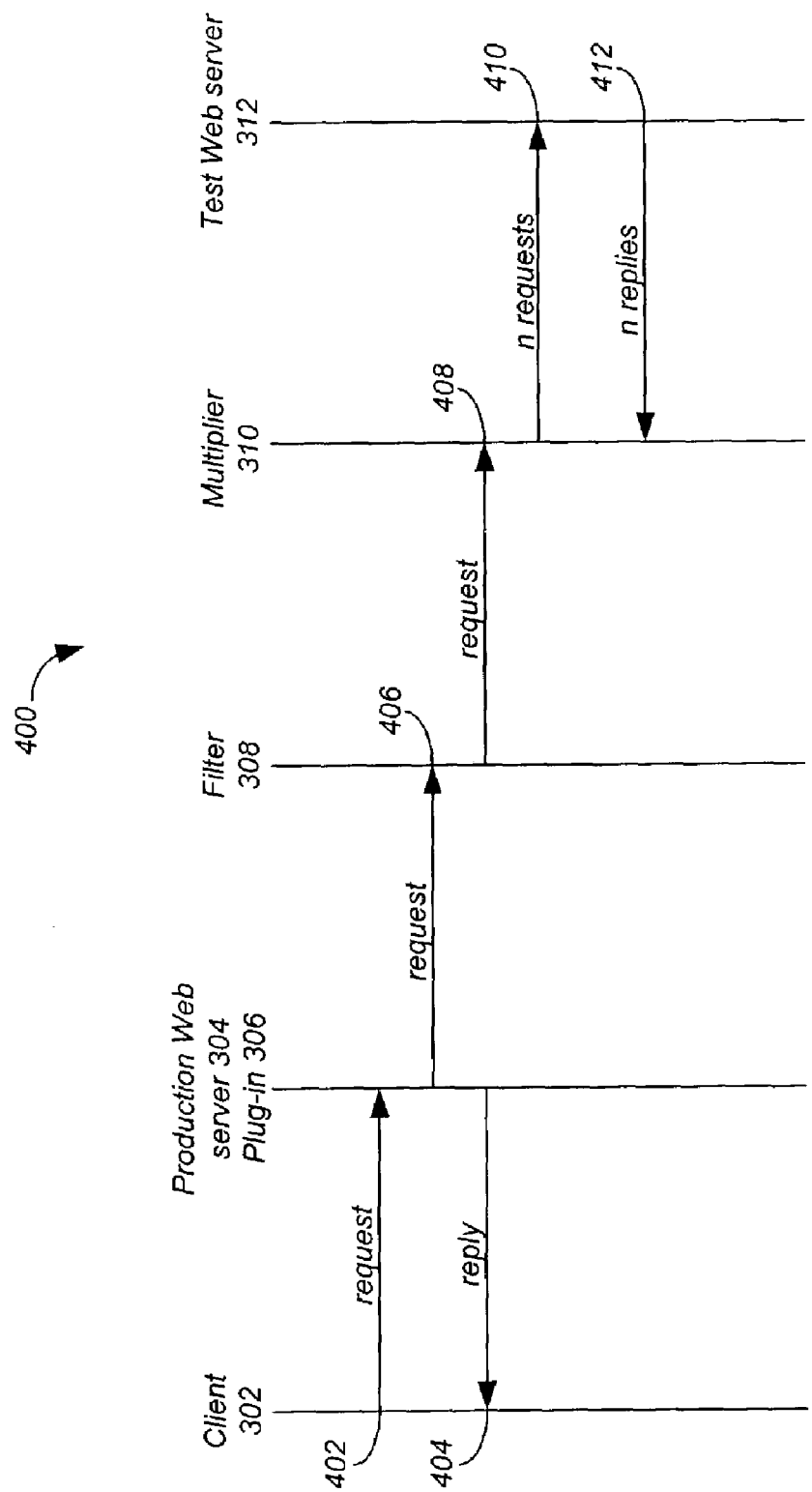
FIG. 4 depicts a process performed by the communications system of FIG. 3 according to one embodiment.

FIG. 4 depicts a process 400 performed by communications system 300 according to one embodiment. Client 302 transmits a HTTP request message to production Web server 304 (step 402). The HTTP request message can be generated automatically or in response to a user action. The HTTP request message includes an identifier of an information component stored on production Web server 304. Production Web server 304 receives the HTTP request message. In response to the HTTP request message, production Web server 304 generates an HTTP reply message according to conventional methods, and transmits the HTTP reply message to client 302 (step 404).

In embodiments employing optional URL filter 308, plug-in 306 transmits a copy of the HTTP request message to URL filter 308 (step 406). In other embodiments, plug-in 306 transmits a copy of the HTTP request message to multiplier 310. URL filter 308 determines whether to forward the HTTP request message to multiplier 310 according to user-selectable filter criteria (step 412). In one embodiment, URL filter 308 applies a regular expression to each HTTP request, and forwards only those HTTP request that match the expression. In another embodiment, URL filter 308 can forward only those HTTP requests that do not match the expression. Other embodiments include various combinations of these and other criteria.

Multiplier 310 receives a forwarded HTTP request message (step 408), and generates a predetermined number n of copies of the HTTP request message, where n≧1. Multiplier 310 transmits the copies of the HTTP request message to test Web server 312 (step 410). In some embodiments multiplier 310 includes a reply analysis tool that analyzes the replies returned by test Web server 302 (step 412) in response to the multiplied requests generated by the multiplier, thereby providing additional test data.

In this way, process 400 "amplifies" all user requests for a particular production Web server information component to a test Web server, thereby increasing the rate of any leakage associated with that information component, making that leak easier and faster to detect and diagnose without disturbing the production environment. In addition, custom or off-the-shelf debugging tools can be used on the test Web server without disturbing the production environment.

Some embodiments include a Web session mapping feature. When a client connects to a Web server, it's common to track the state of the session for that client using a session cookie. The contents of the session cookie are determined by the Web server and sent to the client, which includes the session cookie in subsequent requests to the Web server. But when a request is forwarded from a production Web server to a test Web server, the session cookie is not forwarded, because the test Web server will not understand it. Instead, the multiplier maintains a mapping between corresponding session cookies generated by the development and production Web servers, and performs appropriate session cookie substitutions. When a session is first established, there is no session cookie. In this case, the multiplier recognizes that no session cookie mapping has been established for that session, and so waits for the production Web server to set up a session cookie. Once the session cookie is established, the multiplier forwards the request to the test Web server, and maps the session cookie provided by the development server to the session cookie provided by the production Web server. When the multiplier receives subsequent requests in the session, it substitutes the session cookie according to the mapping before forwarding the request to the test Web server.

Figure 5:
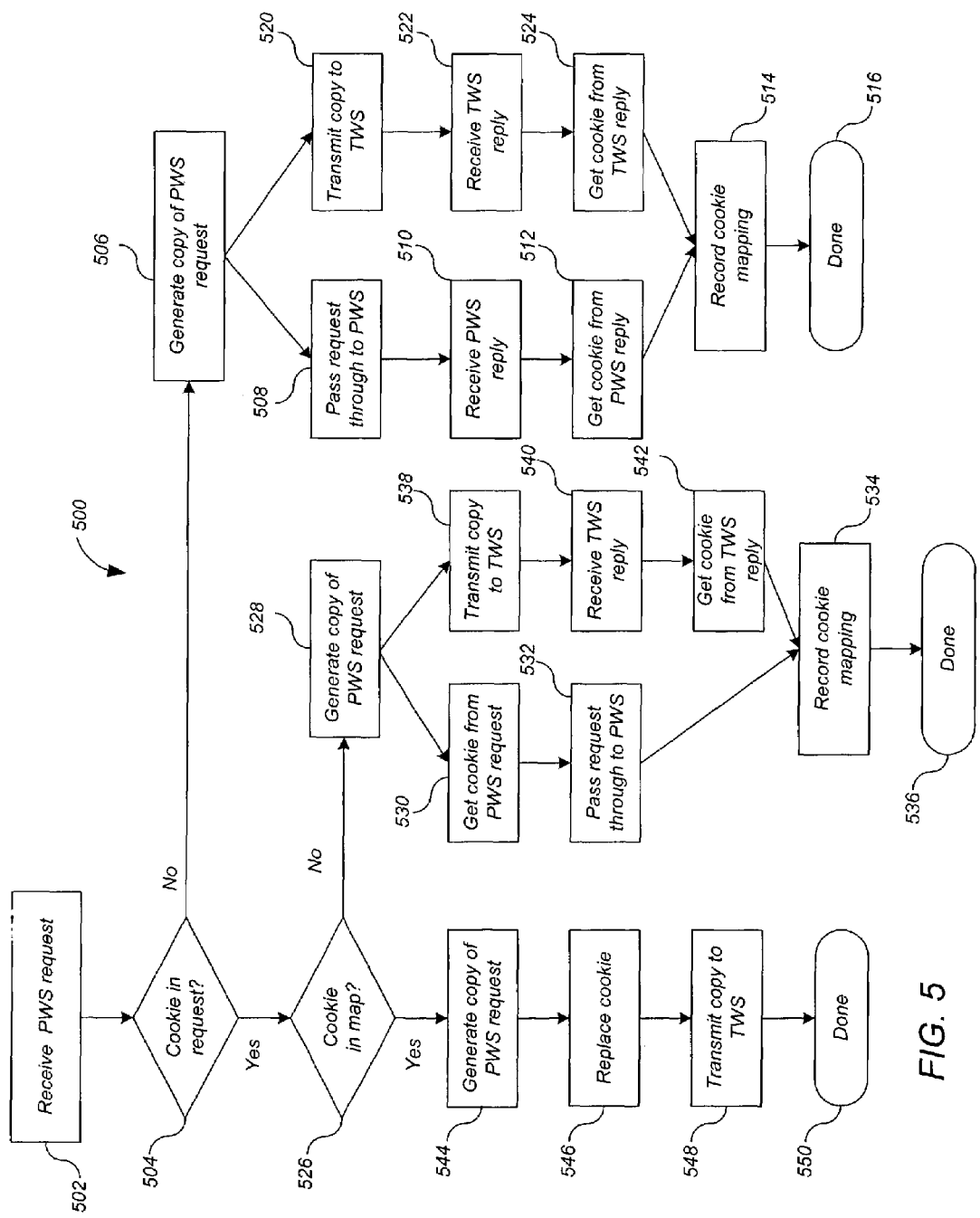
FIG. 5 depicts a process performed by the multiplier of FIG. 1 according to one embodiment.

FIG. 5 depicts a process 500 performed by multiplier 310 according to one embodiment. Multiplier 310 receives a request directed to the production Web server (PWS—step 502), and determines whether the request contains a session cookie (step 504).

If the request does not contain a session cookie, multiplier 310 generates one or more copies of the request (step 506) and transmits the copy or copies to the test Web server (TWS—step 520). When multiplier 310 receives the reply or replies to the request from the test Web server (step 522), it parses the replies to obtain the session cookies provided by the test Web server (step 524). Multiplier 310 also passes the original request to the production Web server (step 508). When multiplier 310 receives the reply to the original request from the production Web server (step 510), it parses the reply to obtain the session cookie provided by the production Web server (step 512). Multiplier 310 then records a cookie mapping between the session cookie obtained from the production Web server in step 512 and the session cookies obtained from the test Web server in step 524 (step 514). Then process 500 ends (step 516).

But if at step 504 the request contains a session cookie, multiplier 310 determines whether the session cookie has been mapped (step 526).

If the request contains a session cookie, and the cookie has been mapped, multiplier 310 generates a copy or copies of the request (step 544), replaces the production Web server session cookie in the copy with the corresponding test Web server cookies from the map (546), and transmits the modified copy or copies to the test Web server (step 548). Then process 500 ends (step 550).

But if at step 526 the session cookie exists in the request but has not been mapped, then multiplier 310 generates a copy or copies of the request from the production Web server (step 528) and transmits the copies to the test Web server (step 538). When multiplier 310 receives the replies to the request from the test Web server (step 540), it parses the replies to obtain the session cookies provided by the test Web server (step 542). Multiplier 310 also parses the original request to obtain the session cookie in the request (step 530) and passes the original request to the production Web server (step 532). Multiplier 310 then records a cookie mapping between the session cookie obtained from the production Web server in step 532 and the session cookies obtained from the test Web server in step 542 (step 534). Then process 500 ends (step 536): In one embodiment, multiplier 310 uses a single test Web server session cookie in all of the copies of a single request. In another embodiment, it uses a different test Web server session cookie in each copy of a single request.

The invention can be implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

A number of implementations of the invention have been described. Nevertheless, it will be understood that various modifications may be made without departing from the spirit and scope of the invention. Accordingly, other implementations are within the scope of the following claims.

What is claimed is:

1. A method of analyzing a resource leak on a first web server using a second web server, comprising:
   receiving, at a first Web server, a first hyper-text transfer protocol (HTTP) request message from a client, the first HTTP request message comprising an identifier of an information component stored on the a first Web server, wherein the first Web server generates a reply to the first HTTP request message, the reply comprising the information component, and sends the reply to the client;
   forward mci the request from the first Web server to a multiplier;
   generating at the multiplier multiple duplicate HTTP request messages for the information component in response to the receiving of the first request, for analyzing a resource leak on said first Web server, each of the duplicate HTTP request messages comprising the identifier of the information component; and
   transmitting the duplicate HTTP request messages to a second Web server, and
   wherein said multiple duplicate HTTP request messages multiply any existing resource leak, thereby facilitating detection, diagnosis or analysis, or combinations thereof, and
   wherein transmitting to said second Web server maintains said first Web server free from receiving said multiple duplicate HTTP request messages.

2. The method of claim 1, wherein the identifier of the information component comprises a Universal Resource Locator (URL), further comprising:
   performing the generating and transmitting steps only when the URL meets predetermined criteria.

3. The method of claim 1, wherein the first HTTP request message comprises a HTTP method, further comprising:
   performing the generating and transmitting steps only when the HTTP method meets predetermined criteria.

4. The method of claim 1, further comprising:
   analyzing effects of the multiple duplicate HTTP request messages upon the second Web server.

5. The method of claim 4, further comprising:
   receiving an HTTP reply message from the second Web server in response to each of the multiple duplicate HTTP request messages; and
   analyzing the HTTP reply messages.

6. The method of claim 1, wherein the first HTTP request message comprises a first session cookie provided by the first Web server, the method further comprising:
   before transmitting the multiple duplicate HTTP request messages to the second Web server, replacing the first session cookie with a second session cookie in each of the duplicate HTTP request messages, the second session cookie being provided by the second Web server and being associated with the first session cookie.

7. The method of claim 1, further comprising:
   receiving a first HTTP reply message from the first Web server in response to the first HTTP request message;
   parsing the first HTTP reply message to obtain a first session cookie provided by the first Web server;
   receiving a multiple duplicate HTTP reply messages from the second Web server in response to each of the multiple duplicate HTTP request messages;
   parsing the multiple duplicate HTTP reply messages to obtain second session cookies provided by the second Web server; and
   associating the first and second session cookies.

8. The method of claim 7, further comprising:
   receiving a second HTTP request message from the client, the second HTTP request message including the first session cookie and an identifier of the same or another information component stored on the first Web server;
   generating one or more further HTTP request messages, each of the further HTTP request messages comprising the identifier of the further information component and the second session cookies; and
   transmitting the further HTTP request messages to the second Web server.

9. The method of claim 1, further comprising:
   parsing the first HTTP request message to obtain a first session cookie provided by the first Web server;
   receiving a HTTP reply message from the second Web server in response to each of the duplicate HTTP request messages;
   parsing the HTTP reply messages to obtain second session cookies provided by the second Web server; and
   associating the first and second session cookies.

10. A method of analyzing a resource leak on a first web server using a second web server, comprising:
    receiving, at a first Web server, a first hyper-text transfer protocol (HTTP) request message, the first HTTP request message including an identifier of an information component stored on the first Web server;
    forwarding the request from the first Web server to a multiplier;
    generating at the multiplier multiple duplicate HTTP request messages for the information component in response to the receiving of the first HTTP request message, for analyzing a resource leak on said first Web server, each of the multiple duplicate HTTP request messages including the identifier of the information component; and
    transmitting the multiple duplicate HTTP request messages to a second Web server, and
    wherein said multiple duplicate HTTP request messages multiply any existing resource leak, thereby facilitating detection, diagnosis or analysis, or combinations thereof, and
    wherein transmitting to said second Web server maintains said first server free from receiving said multiple duplicate HTTP request messages.

11. The method of claim 10, wherein the identifier of the information component comprises a Universal Resource Locator (URL), the method further comprising:
   performing the generating and transmitting steps only when the URL meets predetermined criteria.

12. The method of claim 10, wherein the first HTTP request message comprises a HTTP method, the method further comprising:
   performing the generating and transmitting only when the HTTP method meets predetermined criteria.

13. The method of claim 10, further comprising:
   analyzing effects of the multiple duplicate HTTP request messages upon the second Web server.

14. The method of claim 13, further comprising:
   receiving an HTTP reply message from the second Web server in response to each of the multiple duplicate HTTP request messages; and
   analyzing the HTTP reply messages.

15. Computer-readable media embodying instructions executable by a computer to perform a method of analyzing a resource leak on a first web server using a second web server, comprising:
   receiving, at a first Web server, a first hyper-text transfer protocol (HTTP) request message from a client, the first HTTP request message comprising an identifier of an information component stored on the first Web server, wherein the first Web server generates a reply to the first HTTP request message, the reply comprising the information component, and sends the reply to the client;
   forwarding the request from the first Web server to a multiplier;
   generating at the multiplier multiple duplicate HTTP request messages for the information component, each of the duplicate HTTP request messages comprising the identifier of the information component in response to the receiving of the first duplicate HTTP request message, for analyzing a resource leak on said first Web server; and
   transmitting the duplicate HTTP request messages to a second Web server, and
   wherein said multiple duplicate HTTP request messages multiply any existing resource leak, thereby facilitating detection, diagnosis or analysis, or combinations thereof, and
   wherein transmitting to said second Web server maintains said first Web server free from receiving said multiple duplicate HTTP request messages.

16. The media of claim 15, wherein the identifier of the information component comprises a Universal Resource Locator (URL), wherein the method further comprises:
   performing the generating and transmitting steps only when the URL meets predetermined criteria.

17. The media of claim 15, wherein the first HTTP request message comprises a HTTP method, wherein the method further comprises:
   performing the generating and transmitting only when the HTTP method meets predetermined criteria.

18. The media of claim 15, wherein the method further comprises:
   analyzing effects of the multiple duplicate HTTP request messages upon the second Web server.

19. The media of claim 18, wherein the method further comprises:
   receiving an HTTP reply message from the second Web server in response to each of the multiple duplicate HTTP request messages; and
   analyzing the HTTP reply messages.

20. The media of claim 15, wherein the first HTTP request message comprises a first session cookie provided by the first Web server, and wherein the method further comprises:
   before transmitting the multiple duplicate HTTP request messages to the second Web server, replacing the first session cookie with a second session cookie in each of the multiple duplicate HTTP request messages, the second session cookie provided by the second Web server and associated with the first session cookie.

21. The media of claim 15, wherein the method further comprises
   receiving a first HTTP reply message from the first Web server in response to the first HTTP request message;
   parsing the first HTTP reply message to obtain a first session cookie provided by the first Web server;
   receiving a HTTP reply message from the second Web server in response to each of the multiple duplicate HTTP request messages;
   parsing the second HTTP reply message to obtain a second session cookie provided by the second Web server; and
   associating the first and second session cookies.

22. The media of claim 21, wherein the method further comprises:
   receiving a second HTTP request message from the client, the second HTTP request message comprising the first session cookie and an identifier of the same or another information component stored on the first Web server;
   generating one or more further HTTP request messages, each of the further HTTP request messages comprising the identifier of the further information component and the second session cookie; and
   transmitting the further HTTP request messages to the second Web server.

23. The media of claim 15, wherein the method further comprises:
   parsing the first HTTP request message to obtain a first session cookie provided by the first Web server;
   receiving a HTTP reply message from the second Web server in response to one of the multiple duplicate HTTP request messages;
   parsing the HTTP reply messages to obtain second session cookies provided by the second Web server; and
   associating the first and second session cookies.

24. Computer-readable media embodying instructions executable by a computer to perform a method of analyzing a resource leak on a first web server using a second web server, comprising:
   receiving, at a first Web server, a first hyper-text transfer protocol (HTTP) request message, the first HTTP request message comprising an identifier of an information component stored on the first Web server;
   forwarding the request from the first Web server to a multiplier;
   generating at the multiplier multiple duplicate HTTP request messages for the information component in response to the receiving of the first HTTP request message, for analyzing a resource leak on said first Web server, each of the duplicate HTTP request messages comprising the identifier of the information component; and
   transmitting the duplicate HTTP request messages to the second Web server, and wherein said multiple duplicate HTTP request messages multiply any existing resource leak, thereby facilitating detection, diagnosis or analysis, or combinations thereof, and wherein transmitting to said second Web server maintains said first Web server free from receiving said multiple duplicate HTTP request messages.

25. The media of claim 24, wherein the identifier of the information component comprises a Universal Resource Locator (URL), wherein the method further comprises:
performing the generating and transmitting only when the URL meets predetermined criteria.

26. The media of claim 24, wherein the first HTTP request message comprises a HTTP method, wherein the method further comprises:
performing the generating and transmitting only when the HTTP method meets predetermined criteria.

27. The media of claim 24, wherein the method further comprises:
analyzing effects of the multiple duplicate HTTP request messages upon the second Web server.

28. The media of claim 27, wherein the method further comprises:
receiving an HTTP reply message from the first Web server in response to each of the multiple duplicate HTTP request messages; and
analyzing the HTTP reply messages.

29. A server apparatus configured for analyzing a resource leak using a second web server, comprising:
a first Web server to receive a first hyper-text transfer protocol (HTTP) request message from a client, the first HTTP request message including an identifier of an information component stored on the first Web server, wherein the first Web server generates a reply to the first HTTP request message, the reply comprising the information component, and sends the reply to the client; and
a multiplier for receiving the first HTTP request message from the first Web server to generate multiple duplicate HTTP request messages for the information component in response to the receiving of the first HTTP request message, for analyzing a resource leak on said first Web server, each of the duplicate HTTP request messages including the identifier of the information component,
a second Web server for receiving the duplicate HTTP request messages from the multiplier; and
wherein said multiple duplicate HTTP request messages multiply any existing resource leak, thereby facilitating detection, diagnosis or analysis, or combinations thereof, and
wherein transmitting to said second Web server maintains said first Web server free from receiving said multiple duplicate HTTP request messages.

30. The apparatus of claim 29, wherein the identifier of the information component comprises a Universal Resource Locator (URL), wherein the multiplier generates and transmits the duplicate HTTP request messages only when the URL meets predetermined criteria.

31. The apparatus of claim 29, wherein the first HTTP request message comprises a HTTP method, wherein the multiplier generates and transmits the duplicate HTTP request messages only when the HTTP method meets predetermined criteria.

32. The apparatus of claim 29, wherein the multiplier analyzes effects of the multiple duplicate HTTP request messages upon the second Web server.

33. The apparatus of claim 32, wherein the multiplier receives an HTTP reply message from the second Web server in response to each of the multiple duplicate HTTP request messages; and
analyzes the HTTP reply messages.

34. The apparatus of claim 29, wherein the first HTTP request message comprises a first session cookie provided by the first Web server, and wherein the multiplier, before transmitting the multiple duplicate HTTP request messages to the second Web server, replaces the first session cookie with a second session cookie in each of the multiple duplicate HTTP request messages, the second session cookie provided by the second Web server and associated with the first session cookie.

35. The apparatus of claim 29, wherein the multiplier receives a first HTTP reply message from the first Web server in response to the first HTTP request message;
parses the first HTTP reply message to obtain a first session cookie provided by the first Web server;
receives a multiple duplicate HTTP reply message from the second Web server in response to each of the multiple duplicate HTTP request messages;
parses the second HTTP reply message to obtain a second session cookie provided by the second Web server; and
associates the first and second session cookies.

36. The apparatus of claim 35, wherein the multiplier
(i) receives a second HTTP request message from the client, the second HTTP request message including the first session cookie and an identifier of the same or another information component stored on the first Web server;
(ii) generates one or more further HTTP request messages, each of the further HTTP request messages comprising the identifier of the further information component and the second session cookie; and
(iii) transmits the further HTTP request messages to the second Web server.

37. The apparatus of claim 29, wherein the multiplier
(i) parses the first HTTP request message to obtain a first session cookie provided by the first Web server;
(ii) receives a HTTP reply message from the second Web server in response to one of the multiple duplicate HTTP request messages;
(iii) parses the HTTP reply message to obtain a second session cookie provided by the second Web server; and
(iv) associates the first and second session cookies.

38. A server apparatus configured for analyzing a resource leak using a second web server, comprising:
a first Web server to receive a first hyper-text transfer protocol (HTTP) request message, the first HTTP request message including an identifier of an information component stored on the first Web server;
a multiplier for receiving the first HTTP request message from the first Web server to generate multiple duplicate HTTP request messages for the information component in response to the receiving of the first HTTP request message, for analyzing a resource leak on said first Web server, each of the duplicate HTTP request messages including the identifier of the information component,
a second Web server for receiving the duplicate HTTP request messages from the multiplier; and
wherein said multiple duplicate HTTP request messages multiply any existing resource leak, thereby facilitating detection, diagnosis or analysis, or combinations thereof, and wherein transmitting to said second Web server maintains said first Web server free from receiving said multiple duplicate HTTP request messages.

39. The apparatus of claim 38, wherein the identifier of the information component comprises a Universal Resource Locator (URL), wherein the multiplier generates and transmits the duplicate HTTP request messages only when the URL meets predetermined criteria.

40. The apparatus of claim 38, wherein the first HTTP request message comprises a HTTP method, wherein the multiplier generates and transmits the multiple duplicate HTTP request messages only when the HTTP method meets predetermined criteria.

41. The apparatus of claim 38, wherein the multiplier analyzes effects of the multiple duplicate HTTP request messages upon the second Web server.

42. The apparatus of claim 41, wherein the multiplier receives an HTTP reply message from the second Web server in response to each of the multiple duplicate HTTP request messages; and
analyzes the HTTP reply messages.

43. A computer apparatus configured for analyzing a resource leak using a second computer, comprising:
a first computer for receiving a first hyper-text transfer protocol (HTTP) request message from a client, the first HTTP request message comprising an identifier of an information component stored on the first computer, wherein the first computer generates a reply to the first HTTP request message, the reply comprising the information component, and sends the reply to the client;
multiplier means for receiving the first HTTP request message from the first computer, and for generating multiple duplicate HTTP request messages for the information component in response to the receiving of the first HTTP request message, for analyzing a resource leak on said first computer, each of the duplicate HTTP request messages comprising the identifier of the information component, and
a second computer for receiving the duplicate HTTP request messages from the multiplier means;
wherein said multiple duplicate HTTP request messages multiply any existing resource leak, thereby facilitating detection, diagnosis or analysis, or combinations thereof, and
wherein transmitting to said second computer maintains said first computer free from receiving said multiple duplicate HTTP request messages.

44. The apparatus of claim 43, wherein the identifier of the information component comprises a Universal Resource Locator (URL), wherein the multiplier means generates and transmits the duplicate HTTP request messages only when the URL meets predetermined criteria.

45. The apparatus of claim 43, wherein the first HTTP request message comprises a HTTP method, wherein the multiplier means generates and transmits the multiple duplicate HTTP request messages only when the HTTP method meets predetermined criteria.

46. The apparatus of claim 43, wherein the multiplier means analyzes effects of the duplicate HTTP request messages upon the second computer.

47. The apparatus of claim 46, wherein the multiplier means
(i) receives an HTTP reply message from the second computer in response to each of the duplicate HTTP request messages; and
(ii) analyzes the HTTP reply messages.

48. The apparatus of claim 43, wherein the first HTTP request message comprises a first session cookie provided by the first computer, and wherein the multiplier means, before transmitting the duplicate HTTP request messages to the second computer, replaces the first session cookie with a second session cookie in each of the duplicate HTTP request messages, the second session cookie provided by the second computer and associated with the first session cookie.

49. The apparatus of claim 43, wherein the multiplier means
(i) receives a first HTTP reply message from the first computer in response to the first HTTP request message;
(ii) parses the first HTTP reply message to obtain a first session cookie provided by the first computer;
(iii) receives a second HTTP reply message from the second computer in response to each of the duplicate HTTP request messages;
(iv) parses the second HTTP reply message to obtain a second session cookie provided by the second computer; and
(v) associates the first and second session cookies.

50. The apparatus of claim 49, wherein the multiplier means
(vi) receives a second HTTP request message from the client, the second HTTP request message comprising the first session cookie and an identifier of the same or another information component stored on the first computer;
(vii) generates one or more further HTTP request messages, each of the further HTTP request messages comprising the identifier of the further information component and the second session cookie; and
(viii) transmits the further HTTP request messages to the second computer.

51. The apparatus of claim 43, wherein the multiplier means
(i) parses the first HTTP request message to obtain a first session cookie provided by the first computer;
(ii) receives a HTTP reply message from the second computer in response to one of the duplicate HTTP request messages;
(iii) parses the HTTP reply messages to obtain second session cookies provided by the second computer; and
(iv) associates the first and second session cookies.

52. A computer apparatus configured for analyzing a resource leak using a second computer, comprising:
a first computer for receiving a first hyper-text transfer protocol (HTTP) request message, the first HTTP request message comprising an identifier of an information component stored on the first computer;
multiplier means for receiving the first HTTP request message from the first computer, and for generating multiple duplicate HTTP request messages for the information component in response to the receiving of the first HTTP request message, for analyzing a resource leak on said first computer, each of the duplicate HTTP request messages comprising the identifier of the information component,
a second computer for receiving the duplicate HTTP request messages, and
wherein said multiple duplicate HTTP request messages multiply any existing resource leak, thereby facilitating detection, diagnosis or analysis, or combinations thereof, and wherein transmitting to said second computer maintains said first computer free from receiving said multiple duplicate HTTP request messages.

53. The apparatus of claim 52, wherein the identifier of the information component comprises a Universal Resource Locator (URL), wherein the multiplier means generates and transmits the multiple duplicate HTTP request messages only when the URL meets predetermined criteria.

54. The apparatus of claim 52, wherein the first HTTP request message comprises a HTTP method, wherein the multiplier means generates and transmits the multiple duplicate HTTP request messages only when the HTTP method meets predetermined criteria.

55. The apparatus of claim 52, wherein the multiplier means analyzes effects of the duplicate HTTP request messages upon the first computer.

56. The apparatus of claim 55, wherein the multiplier means
  (i) receives an HTTP reply message from the second computer in response to each of the duplicate HTTP request messages; and
  (ii) analyzes the HTTP reply messages.

* * * * *